United States Patent [19]

Ueno

[11] 4,042,190
[45] Aug. 16, 1977

[54] CONVEYANCE TRUCK WITH MOVABLE SEAL PLATES

[75] Inventor: Eijiro Ueno, Tokyo, Japan

[73] Assignees: Ueno Kohgyo Ltd., Tokyo; Taishin Kohgyo Co., Ltd., Kawaguchi, both of Japan

[21] Appl. No.: 633,545

[22] Filed: Nov. 19, 1975

[51] Int. Cl.² .................................................. B65G 51/04
[52] U.S. Cl. ................................................ 243/32; 243/39
[58] Field of Search ............................ 243/32, 33, 34, 35, 243/38, 39; 104/138 R, 138 G, 155, 156; 105/365

[56] References Cited

U.S. PATENT DOCUMENTS

| 839,646 | 12/1906 | Roberts | 243/39 X |
|---|---|---|---|
| 1,779,164 | 10/1930 | Grover | 243/39 |
| 1,870,258 | 8/1932 | MacMillan | 243/39 X |
| 3,734,428 | 5/1973 | Alexandrov et al. | 243/33 |
| 3,949,953 | 4/1976 | Hopkins | 243/39 X |

FOREIGN PATENT DOCUMENTS

| 1,223,767 | 8/1966 | Germany | 243/33 |
|---|---|---|---|
| 10,167 | 4/1844 | United Kingdom | 243/39 |
| 999,621 | 7/1965 | United Kingdom | 243/39 |

Primary Examiner—Evon C. Blunk
Assistant Examiner—James L. Rowland
Attorney, Agent, or Firm—Wenderoth, Lind & Ponack

[57] ABSTRACT

A conveyance truck for an air conveyance system provided with movable seal plates. The seal plates are so mounted to always and completely maintain the airtightness between the transport tube and the conveyance truck.

2 Claims, 13 Drawing Figures

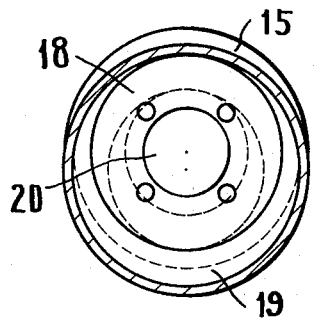
Fig-8-
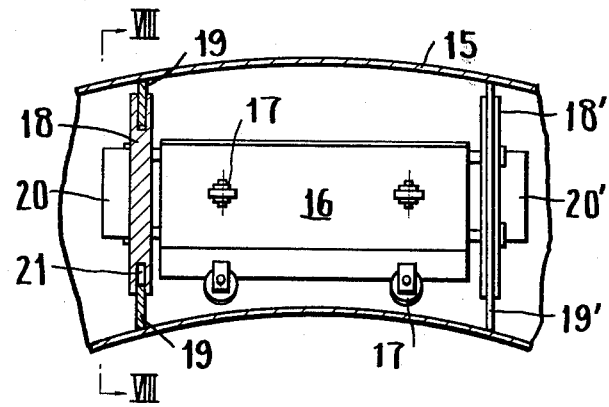
Fig-7-
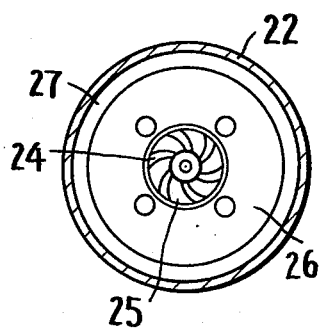
Fig-10-
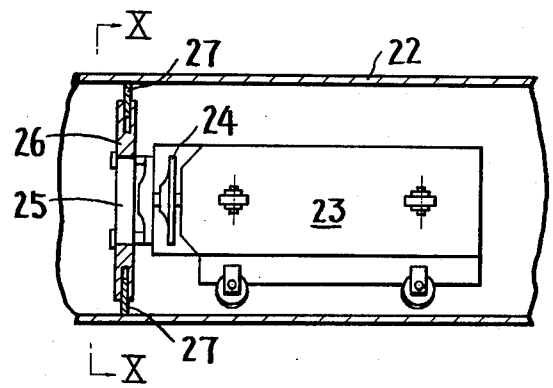
Fig-9-
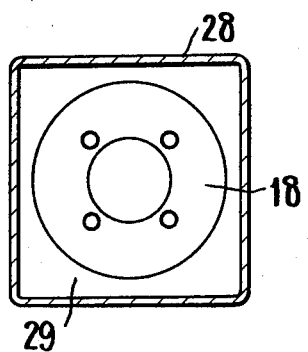
Fig-11-
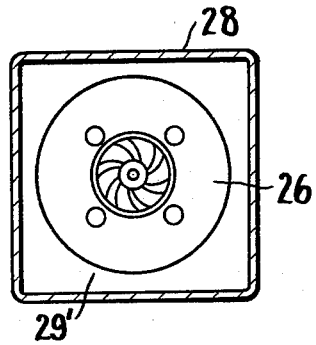
Fig-12-
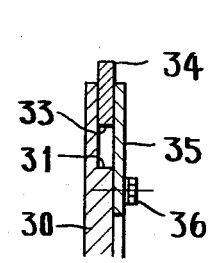
Fig-13-

CONVEYANCE TRUCK WITH MOVABLE SEAL PLATES

BACKGROUND OF THE INVENTION

This invention relates to a conveyance truck provided with movable seal plates in an air conveyance system.

In the air conveyance system designed to move a conveyance truck by air pressure or by suction or by the action of suction induced by a fan carried thereon within a cylindrical or square-shaped transport tube, the airtightness between the conveyance truck and the transport tube must always completely be maintained. For this purpose, the transport tube is usually installed as linearly as possible so as to avoid occurrence of air leakage between the transport tube and the conveyance truck.

However, it is impossible to always maintain a linear condition with respect to installation of the transport tube under the environmental circumstances, and as a result, curved paths must absolutely be provided. In a curved portion of the transport tube, the joining relationship between the seal plates and the transport tube is varied to impair the closed condition causing air leaks to occur, resulting in a great decrease in transport efficiency.

SUMMARY OF THE INVENTION

This invention provides an air conveyance system designed to move a conveyance truck by air pressure or by suction or by self-movement utilizing the action of suction induced by a fan carried thereon within a cylindrical or square-shaped transport tube, wherein seal plates to be mounted on the conveyance truck are movably retained.

It is an object of the present invention to improve the efficiency of the air conveyance system.

It is another object of the invention to movably mount seal plates in order to always and completely maintain the air-tightness between the transport tube and the conveyance truck.

It is a further object of the invention to retain seal materials on the seal plates.

Other objects and features of the invention will appear more fully hereinafter from a consideration of the following description taken in connection with the accompanying drawings.

BRIEF DESCRIPTION OF THE DRAWINGS

The drawings are for purpose of describing the invention in detail, in which:

FIG. 7 is a longitudinal sectional view showing the seal relationship between the transport tube and the conveyance truck when the truck of FIG. 6 is at a curved portion of the cylindrical transport tube;

FIG. 8 is a sectional view taken on the line VIII—VIII of FIG. 7;

FIG. 9 is a longitudinal sectional view showing the seal relationship between a conveyance truck having seal plates for retaining seal materials secured thereto and moved in a mode of self-movement by a fan carried thereon and a cylindrical transport tube;

FIG. 10 is a sectional view taken on the line X—X of FIG. 9;

FIG. 11 is a sectional view of a square-shaped transport tube with a conveyance truck moved under pressure or by suction viewed from the front;

FIG. 12 is a sectional view of a square-shaped transport tube with a conveyance truck moved in a mode of self-movement viewed from the front; and FIG. 13 is a fragmentary sectional view showing one form of embodiment in which seal materials are movably retained on seal plates secured to a conveyance truck.

DESCRIPTION OF THE PREFERRED EMBODIMENTS

Figure 3:
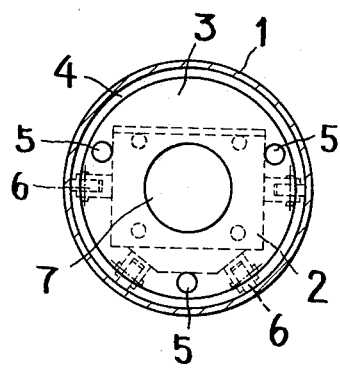
FIG. 3 is a sectional view taken on the line III—III of FIG. 1.

First, embodiments of the present invention shown in FIGS. 1–4 will be described.

A conveyance truck 2, which is moved within a cylindrical transport tube 1 under pressure or through a suction device (not shown), has seal plates 3, 3' mounted frontwardly and rearwardly thereof by means of a plurality of springs 5 to secure air-tightness relative to the transport tube 1.

In the outer periphery of the seal plates 3, 3' there are fitted felts 4, 4' to enhance air-tightness. It should be noted that the seal plate 3 and the felt 4 are not necessarily constructed individually, but a one-piece felt and seal plate structure may also be employed.

Figure 1:
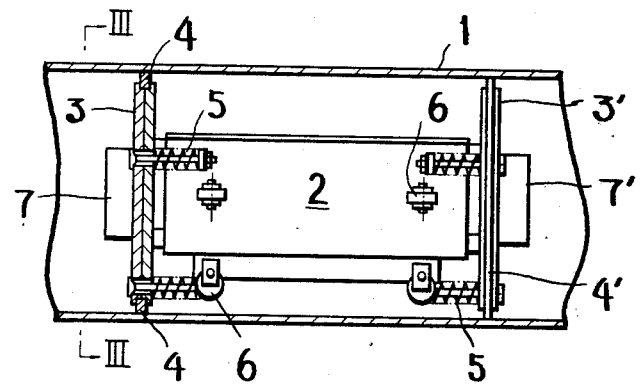
FIG. 1 is a longitudinal sectional view showing the seal relationship between seal plates movably mounted on a conveyance truck moved under air pressure or by suction and a cylindrical transport tube.

As shown in FIGS. 1 and 3, the conveyance truck 2 is provided with eight guide rollers 6 disposed on the undersurface and sides thereof so as to allow the truck to run smoothly along the inner sides of the transport tube 1 and to support the truck 2. Cushions 7 and 7' are provided frontwardly and rearwardly to damp impact occurred when the conveyance truck is stopped.

Figure 4:
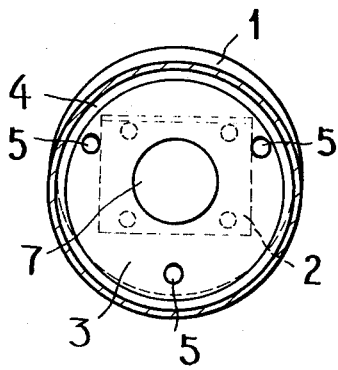
FIG. 4 is a sectional view taken on the line IV—IV of FIG. 2.
Figure 2:
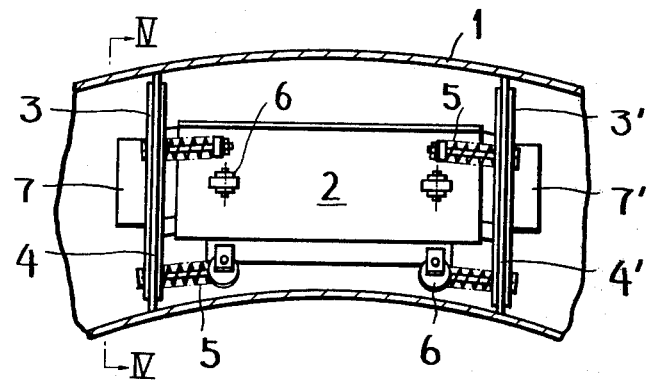
FIG. 2 is a longitudinal sectional view showing the seal relationship between the transport tube and the conveyance truck when the truck of FIG. 1 is at a curved portion of the cylindrical transport tube.

When the conveyance truck is at a linear portion of the transport tube 1, the truck 2 is in a concentric relation with the seal plates 3, 3' with felts 4, 4' fitted therein, as shown in FIG. 1, whereas when the truck is at a curved portion of the transport tube 1, the truck 2 and seal plates 3, 3' are displaced due to strain caused by the springs 5, as shown in FIGS. 2 and 4.

This leads to the fact that air-tightness between the transport tube 1 and the truck 2 can always maintain a full sealing function regardless of deformation of the transport tube 1.

Figure 5:
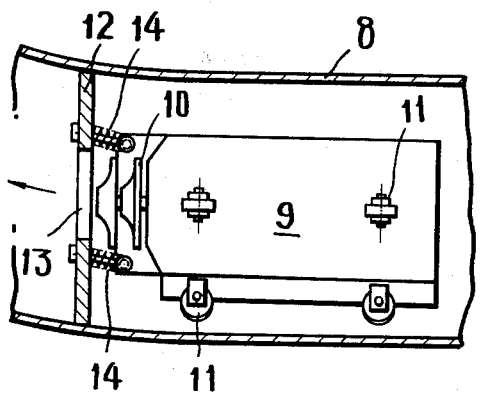
FIG. 5 is a longitudinal sectional view showing the seal relationship between seal plates movably mounted on a conveyance truck moved in a mode of self-movement by a fan carried thereon and a cylindrical transport tube.
Figure 6:
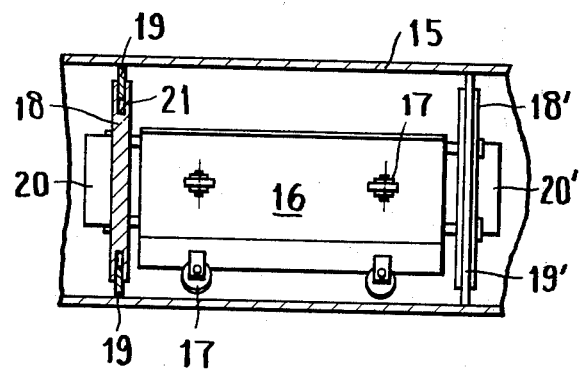
FIG. 6 is a longitudinal sectional view showing the seal relationship between a conveyance truck moved under air pressure or by suction, said truck having seal plates for retaining seal materials secured thereto, and a cylindrical transport tube.

FIG. 5 shows an arrangement wherein seal plates in accordance with the present invention are movably mounted on a conveyance truck 9 moved in a mode of self-movement within a cylindrical transport tube 8, in which the internal pressure of the transport tube constantly is controlled by means of dampers disposed in spaced relation as required. This conveyance truck 9 comprises a fan 10 carried thereon, eight guide rollers 11 disposed in the outer periphery thereof, and a seal plate 12 formed with an opening 13 frontwardly thereof, said seal plate being movably mounted through a plurality of springs 14. When the fan 10 is driven to suck air through the opening 13 made in the seal plate 12, the front portion of the conveyance truck 9 within the transport tube 8 becomes negative pressure, while the rear portion thereof becomes high pressure to thereby advance the truck 9.

When the conveyance truck 9 arrives at the curved portion of the transport tube 8, the seal plate 12 is displaced due to strain of a plurality of springs 14 to thereby maintain an air-tight relationship between the transport tube 8 and the truck 9, and the truck keeps moving forward.

While a one-piece felt and seal plate 12 has been incorporated in the embodiment shown in FIG. 5, it will be noted that a seal plate with a separate felt fitted in the outer periphery thereof as shown in FIG. 2 may also be used.

FIGS. 6 through 10 illustrate modified forms of various embodiments according to the present invention, wherein seal materials are movably retained on seal plates secured to a conveyance truck to thereby secure air-tightness between the conveyance truck and the transport tube.

Likewise, FIGS. 9 and 10 illustrate an arrangement wherein a seal plate 26 is secured to a conveyance truck 23 with a fan 24 carried thereon, said seal plate movably retaining a seal material 27 thereon. The the fan 24 may be viewed through an opening 25 made in the seal plate 26. The air-tightness between a transport tube 22 and the conveyance truck 23 may be maintained by the eccentric movement of the seal material 27.

FIGS. 11 and 12 are sectional views of a transport tube with a seal plate 18 and a seal material 29 of a conveyance truck moved within a square-shaped transport tube 28 under pressure or by suction and a seal plate 26 and a seal material 29' of a conveyance truck moved within the square-shaped transport tube 28 in a mode of self-movement, respectively, viewed from the front, showing the seal relationship by means of seal materials.

FIG. 13 is a fragmentary sectional view showing a specific embodiment, in which a seal material is movably retained on a seal plate secured to a conveyance truck. In this arrangement, a seal plate 30 is formed with a stepped portion 31, to which is attached a seal material 34 having an internal opening 33 greater in diameter than the stepped portion, and a keep plate 35 is fastened by a screw 36 to the side of the seal plate to thereby hold the seal material 34, the seal material being biased in one direction by the amount of difference in diameter as described with respect to the seal plate.

From the detailed description discussed above, it will be appreciated that the present invention provides an air conveyance system designed to move a conveyance truck under air pressure or by suction or by self-movement utilizing the action of suction induced by a fan carried thereon within a cylindrical or square-shaped transport tube, wherein seal plates are movably mounted on the conveyance truck through several springs or are movably retained in eccentric fashion on seal plates secured to the conveyance truck, whereby even if the transport tube should vary in contour from its linear contour into a curved portion or the like, it will securely be displaced and the seal plates or seal materials in a state movable relative to the conveyance truck may securely follow that variation to thereby maintain a positive air-tightness, thus avoiding the occurrence of air leaks. For this reason, high efficiency of the entire apparatus may be maintained.

In addition, retention of the seal material to the seal plate may be accomplished in a simple manner such that the seal material attached to the stepped portion formed in the seal plate is lightly urged by the keep plate screwed into the seal plate.

What is claimed is:

1. A conveyance truck for being movably positioned within a transport tube, said truck comprising:
    a truck body;
    a plurality of roller means affixed to the undersurface and sides of said truck body for supporting said truck body against the walls of said transport tube and for allowing said truck body to run along the inside of said tube; and
    seal plate means attached to each end of said truck body and forced against the inside of said tube for securing said truck body air-tightly within said tube;
    spring means connecting said seal plate means to said truck body for displacing said seal plate means relative to the position of said truck body with respect to curvatures of said tube and maintaining said seal plate means in contact with the inside of said tube, whereby said seal plate means continuously contacts said tube wall and an air-tight seal is maintained regardless of curvatures in said transport tube;
    and
    said seal means is comprised of:
        a seal plate member attached to said spring means and spaced from the end of said truck body, the outer edge of said seal plate member being spaced from the inside edge of said tube and having a groove therein around the circumference thereof; and
        sealing material fitted in said groove in said plate member and extending outward therefrom against the inside of said tube.

2. A truck as claimed in claim 1 wherein said sealing material is felt.

* * * * *